(12) United States Patent
Yang et al.

(10) Patent No.: US 10,965,796 B2
(45) Date of Patent: Mar. 30, 2021

(54) MOBILE TERMINAL

(71) Applicant: LG ELECTRONICS INC., Seoul (KR)

(72) Inventors: Hyunsuk Yang, Seoul (KR); Hangseok Kim, Seoul (KR); Minho Park, Seoul (KR); Jaeyoung Han, Seoul (KR); Jungyun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/470,088

(22) PCT Filed: Dec. 16, 2016

(86) PCT No.: PCT/KR2016/014812
§ 371 (c)(1),
(2) Date: Jun. 14, 2019

(87) PCT Pub. No.: WO2018/110749
PCT Pub. Date: Jun. 21, 2018

(65) Prior Publication Data
US 2019/0320048 A1    Oct. 17, 2019

(51) Int. Cl.
*G06F 1/16* (2006.01)
*H04M 1/02* (2006.01)

(52) U.S. Cl.
CPC ....... *H04M 1/0247* (2013.01); *H04M 1/0214* (2013.01); *H04M 1/0235* (2013.01); *H04M 1/0262* (2013.01); *H04M 1/0268* (2013.01)

(58) Field of Classification Search
CPC .... H04M 1/0214; H04M 1/0247; H04M 1/02; H04M 1/0268; H04M 1/021; G06F 1/1616; G06F 1/1666
See application file for complete search history.

(56) References Cited

U.S. PATENT DOCUMENTS

| | | | | |
|---|---|---|---|---|
| 10,008,135 B2* | 6/2018 | Lim | ...................... | H05K 5/0226 |
| 10,306,783 B2* | 5/2019 | Seo | ...................... | H05K 5/0226 |

(Continued)

FOREIGN PATENT DOCUMENTS

| | | |
|---|---|---|
| JP | 5801367 B2 | 10/2015 |
| KR | 10-2012-0117140 A | 10/2012 |

(Continued)

*Primary Examiner* — Liton Miah
(74) *Attorney, Agent, or Firm* — Birch, Stewart, Kolasch & Birch, LLP

(57) ABSTRACT

The present invention relates to a three-stage foldable mobile terminal having a flexible display, and can provide a mobile terminal comprising: a body portion which comprises first to third bodies rotatably connected to each other and which implements a first state in which the first to third bodies are arranged side by side in one direction and a second state in which the first to third bodies overlap each other by the at least one hinge unit, respectively; and a flexible display unit which is mounted on the body portion, wherein the body portion comprises: a main circuit board which is disposed on the first body; a flexible circuit board which electrically connects the first and second bodies in the first state; and a connection member which is disposed on the second body so that the main circuit board and the third body are electrically connected to each other in the second state.

18 Claims, 12 Drawing Sheets

(56) References Cited

U.S. PATENT DOCUMENTS

| | | | |
|---|---|---|---|
| 10,491,724 B2* | 11/2019 | Lin | G06F 1/1616 |
| 10,725,725 B2* | 7/2020 | Gao | G06F 3/0487 |
| 2007/0146977 A1* | 6/2007 | Choi | H04M 1/0247 |
| | | | 361/679.4 |
| 2008/0174127 A1* | 7/2008 | Kim | E05C 19/166 |
| | | | 292/251.5 |
| 2010/0064244 A1* | 3/2010 | Kilpatrick, II | G06F 1/1616 |
| | | | 715/773 |
| 2010/0064536 A1* | 3/2010 | Caskey | G06F 1/1616 |
| | | | 33/303 |
| 2011/0241998 A1* | 10/2011 | McKinney | G06F 1/3265 |
| | | | 345/168 |
| 2013/0010405 A1 | 1/2013 | Rothkopf et al. | |
| 2013/0250492 A1* | 9/2013 | Wong | G06F 1/1641 |
| | | | 361/679.01 |
| 2013/0321264 A1* | 12/2013 | Park | G06F 3/002 |
| | | | 345/156 |
| 2013/0321340 A1* | 12/2013 | Seo | H04M 1/0214 |
| | | | 345/174 |
| 2014/0211399 A1* | 7/2014 | O'Brien | G06F 1/1652 |
| | | | 361/679.26 |
| 2014/0285476 A1* | 9/2014 | Cho | H04M 1/0268 |
| | | | 345/204 |
| 2016/0109908 A1 | 4/2016 | Siddiqui | |
| 2020/0050318 A1* | 2/2020 | Ure | G06F 1/1632 |

FOREIGN PATENT DOCUMENTS

| | | |
|---|---|---|
| KR | 10-1231594 B1 | 2/2013 |
| KR | 10-1329946 B1 | 11/2013 |

* cited by examiner (a)

(b)

(a)

(b)

MOBILE TERMINAL

CROSS REFERENCE TO RELATED APPLICATIONS

This application is the National Phase of PCT International Application No. PCT/KR2016/014812, filed on Dec. 16, 2016, which is hereby expressly incorporated by reference into the present application.

TECHNICAL FIELD

The present disclosure relates to a three-stage foldable mobile terminal having a flexible display.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Such mobile terminals are evolving into various types of designs and efforts are being made to develop more novel types of mobile terminals in order to meet the needs of users who desire newer and more various designs. The novel types include structural changes and improvements for the users to use the mobile terminals more conveniently. As one of such structural changes and improvements, mobile terminals in which at least part of a display unit can be bent or curved are attracting attention.

However, a deformable structure is required for stable implementation of a display unit capable of being curved at a specific curvature. In recent years, studies on mobile terminals which are foldable into three stages have been carried out. However, there is a lack of structure to stably maintain a deformed state, and configurations and structures required for such mobile terminals to operate normally in a state folded into three stages have not been sufficiently studied.

DISCLOSURE

Technical Problem

One aspect of the present disclosure is to provide a structure of a mobile terminal, in which a plurality of bodies coupled to be relatively rotatable is implemented in the form of a mobile terminal respectively in a first state where they are unfolded side by side in one direction and a second state where they are stacked on one another in an overlapping manner.

Another aspect of the present disclosure is to provide a structure for electrically connecting electronic components provided in the plurality of bodies in the first and second states.

Still another aspect of the present disclosure is to provide a structure in which a flexible display unit attached to a terminal body part, which is foldable into three stages, is maintained to be more level.

Technical Solution

To achieve these aspects and other advantages of the present disclosure, there is provided a mobile terminal, including a body part that is provided with first to third bodies rotatably connected to one another, and that implements a first state in which the first to third bodies are arranged side by side in one direction and a second state in which the first to third bodies overlap as the first and third bodies are rotated respectively in different directions, with respect to the second body, by at least one hinge unit, and a flexible display unit mounted on the body part and realized into an unfolded state in the first state and a folded state in the second state. The body part may include a main circuit board disposed in the first body, a flexible circuit board electrically connecting the first and second bodies so that the main circuit board and electronic components disposed in the second body are electrically connected in the first state, and a connection member fixedly inserted into the second body such that the main circuit board and electronic components disposed in the third body are electrically connected in the second state.

In one embodiment according to the present disclosure, the connection member may include first and second protrusions, and the first and third bodies may include first and second connection members corresponding to the first and second protrusions, so that the first and third bodies are electrically connected to each other.

In one embodiment according to the present disclosure, the second body may include a first frame, and a second frame slidably mounted on the first frame, and the second frame may be slid in a direction away from the first body so that the flexible display unit is switched from the second state to the first state.

In one embodiment of the present disclosure, the first frame may further include movement guide portions protruding from both ends of the first frame to partially cover both ends of the second frame, so as to guide a movement direction of the second frame.

In one embodiment of the present disclosure, the hinge unit may include a first hinge portion having a hinge shaft in a cylindrical shape, and the first body may be mounted to be rotatable in one direction with respect to the second body by virtue of the first hinge portion.

In one embodiment of the present disclosure, the flexible display unit may include a first bending area supported by the first hinge portion and formed to surround a part of an outer circumferential surface of the hinge shaft in the second state.

In one embodiment of the present disclosure, the hinge unit may further include a second hinge portion connecting the second and third bodies to each other, and the second hinge portion may be hidden from outside of the body part in the first state.

In one embodiment according to the present disclosure, the flexible display unit may include a second bending area that is partially supported by the second hinge portion and may be bent in the second state by an accommodating unit, which is formed adjacent to the second hinge portion.

In one embodiment according to the present disclosure, the accommodating unit may include first and second accommodating portions formed on one surface of the second body and one surface of the third body, respectively, so that the second bending area is integrally accommodated in the first and second accommodating portions in a bent state.

In one embodiment of the present disclosure, the third body may be provided with a bent portion formed at an end portion adjacent to the hinge shaft mounted in the first body in the second state, and bent to surround at least part of an outer circumferential surface of the hinge shaft when the first state is switched to the second state.

In one embodiment of the present disclosure, the first body may include a receiving portion which is formed adjacent to the first and second portions when the body part is in the second state, so that the second and third bodies are received therein in an overlapped state.

In one embodiment of the present disclosure, the mobile terminal may include first to third magnet portions disposed in first to third bodies, respectively, so that the body part can be changed in state from the first state to the second state or vice versa by attractive force or repulsive force generated between the first to third bodies.

In one embodiment according to the present disclosure, the second and third magnet portions may be arranged to generate attractive force with each other, so that the body part can be fixed in the second state.

In one embodiment according to the present disclosure, the mobile terminal may further include a button portion mounted on the first body to be pressed by external force and moving the first magnet portion in a pressed direction thereof so that the first magnet portion generates repulsive force against the second magnet portion as being pressed.

In one embodiment of the present disclosure, the mobile terminal may further include an elastic portion having at least one spring mounted on one side of the button portion to apply restoring force to the button portion and deformed in a contracting or expanding manner.

In one embodiment of the present disclosure, the second body may include a power supply unit having a mobile battery configured to supply power to the mobile terminal, and mounted in the second frame to be slidable with respect to the first frame, and the mobile battery may be electrically connected to the main circuit board through the flexible circuit board.

In one embodiment of the present disclosure, a current passed through a charging module, which is disposed at the third body to receive a current from an external charger, may be applied to the main circuit board through the connection member and the current applied to the main circuit board may be supplied to the power supply unit through the flexible circuit board, when the body part is in the second state.

Advantageous Effects

According to the present disclosure, first to third bodies can be connected by at least one hinge unit, so that the first and third bodies can be rotated in different directions with respect to the second body, which may result in realizing a structure of a mobile terminal which is stably foldable into three stages.

According to the present disclosure, a configuration of a connection member, such as a Pogo pin, may be disposed in the second body which is located between the first and third bodies, so that the first and third bodies can be electrically connected to each other through the connection member in the second state, which may result in implementing the mobile terminal to normally operate in the second state.

According to the present disclosure, a second frame may be provided which is relatively movable by one area of the flexible display unit that covers the hinge unit in the second state, which may allow the full flexible display unit to be maintained evenly in the first state.

According to the present disclosure, magnets may be disposed on one end portion of each of the first to third bodies, so as to facilitate the flexible display unit to be switched into a folded state and an unfolded state even by weak external force, by use of attractive force and repulsive force among the magnets.

This may result in minimizing damages on folded areas of the flexible display unit, which are caused due to repetitive deformation to the folded and unfolded states of the flexible display unit. Also, image output quality on the folded areas can be improved.

Figure 2A:
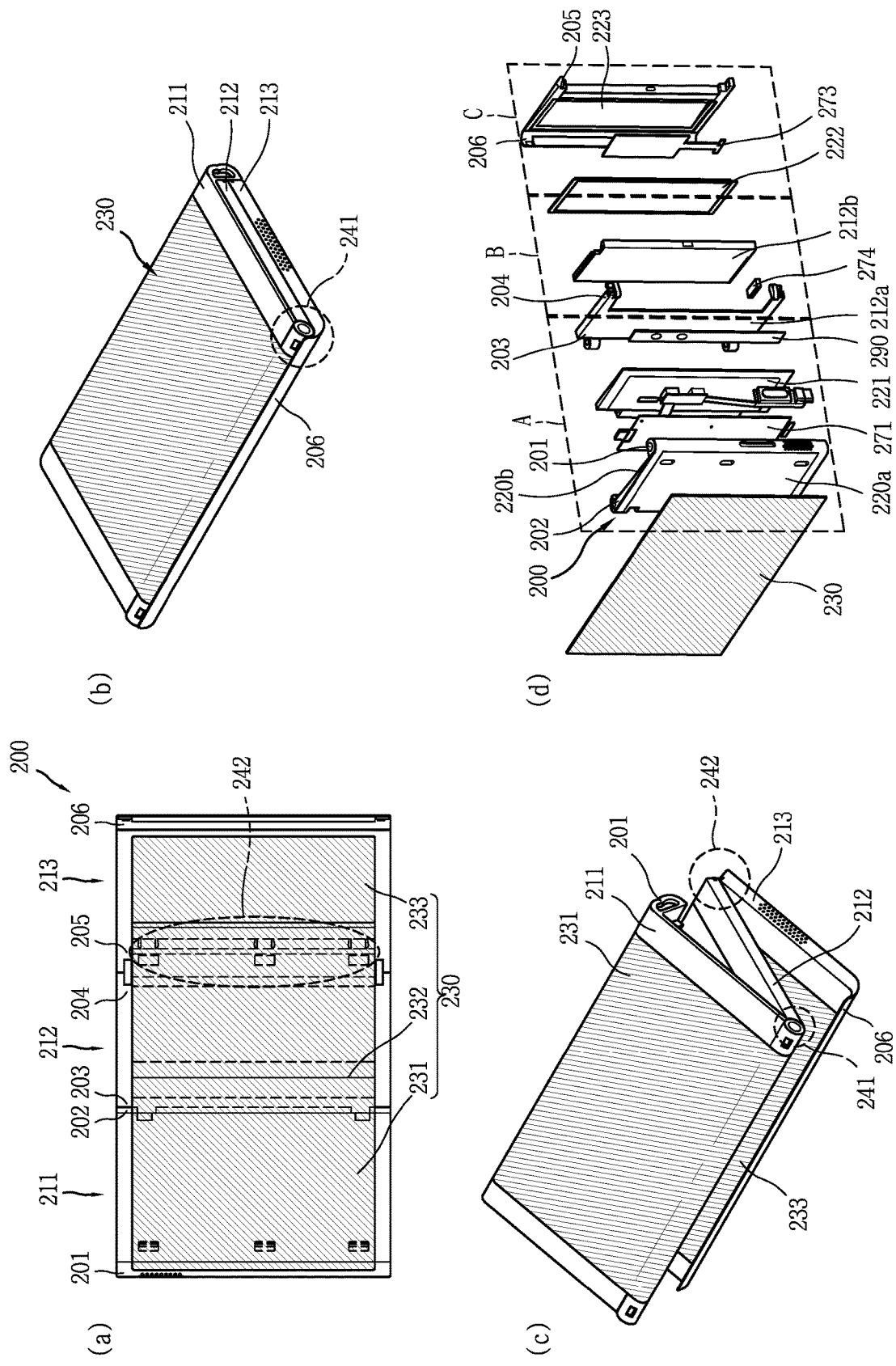
FIG. 2A is a perspective view illustrating a mobile terminal having a flexible display unit.

(a) of FIG. 2A is a view illustrating a mobile terminal in a first state in which first to third bodies are arranged side by side in one direction.

(b) of FIG. 2A is a view illustrating a mobile terminal in a second state in which the first to third bodies overlap one another.

(c) of FIG. 2A is a view illustrating a mobile terminal in an intermediate state that the first state is switched to the second state.

(d) of FIG. 2A is an exploded view of a mobile terminal in accordance with one embodiment of the present disclosure.

Figure 2B:
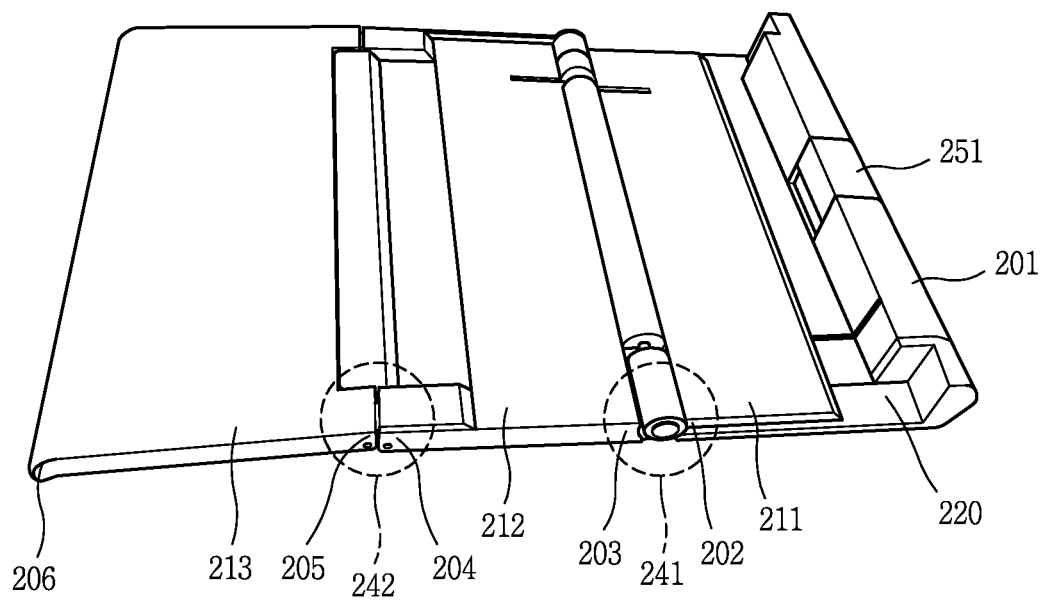

FIG. 2B is a rear view of a body part when the body part is in the first state.

Figure 2C:
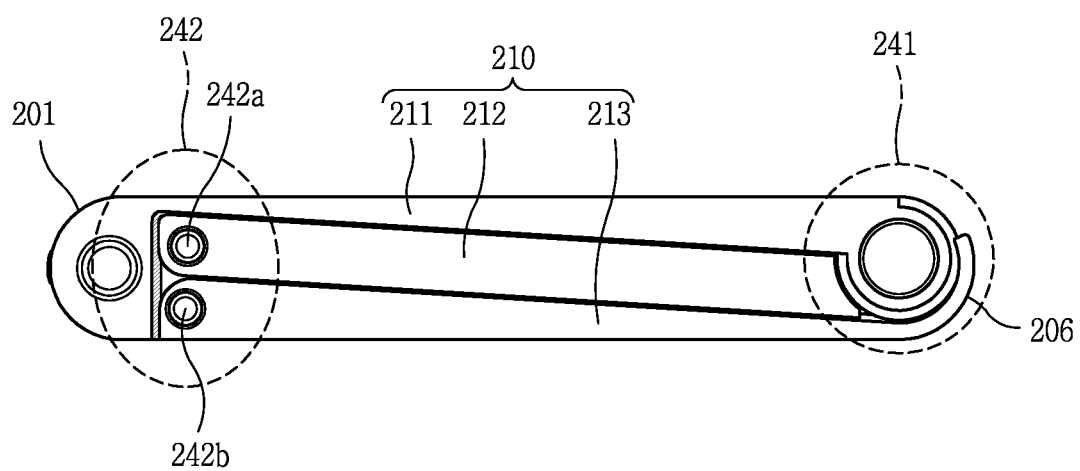

FIG. 2C is a lateral view of the body part when the body part is in the second state.

Figure 3A:
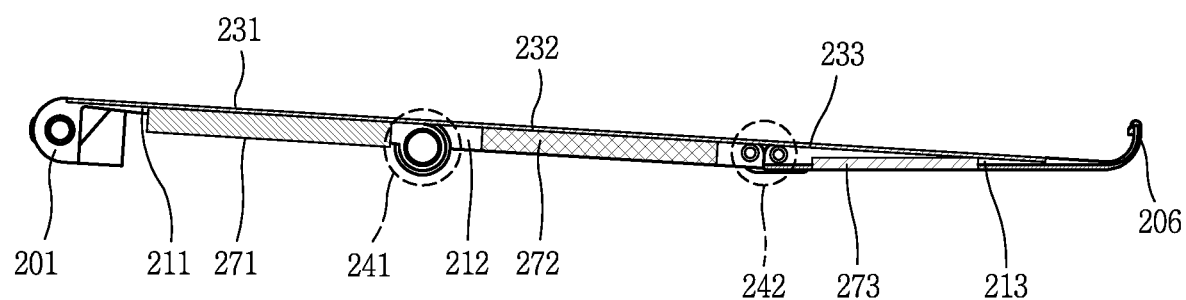
Figure 3B:
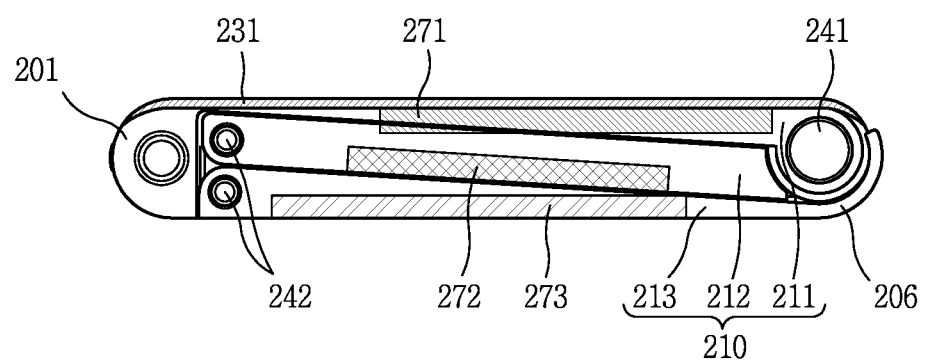

FIGS. 3A and 3B are cross-sectional views illustrating mounting spaces of electronic components for driving the mobile terminal in accordance with the one embodiment of the present disclosure in the first and second states.

Figure 4A:
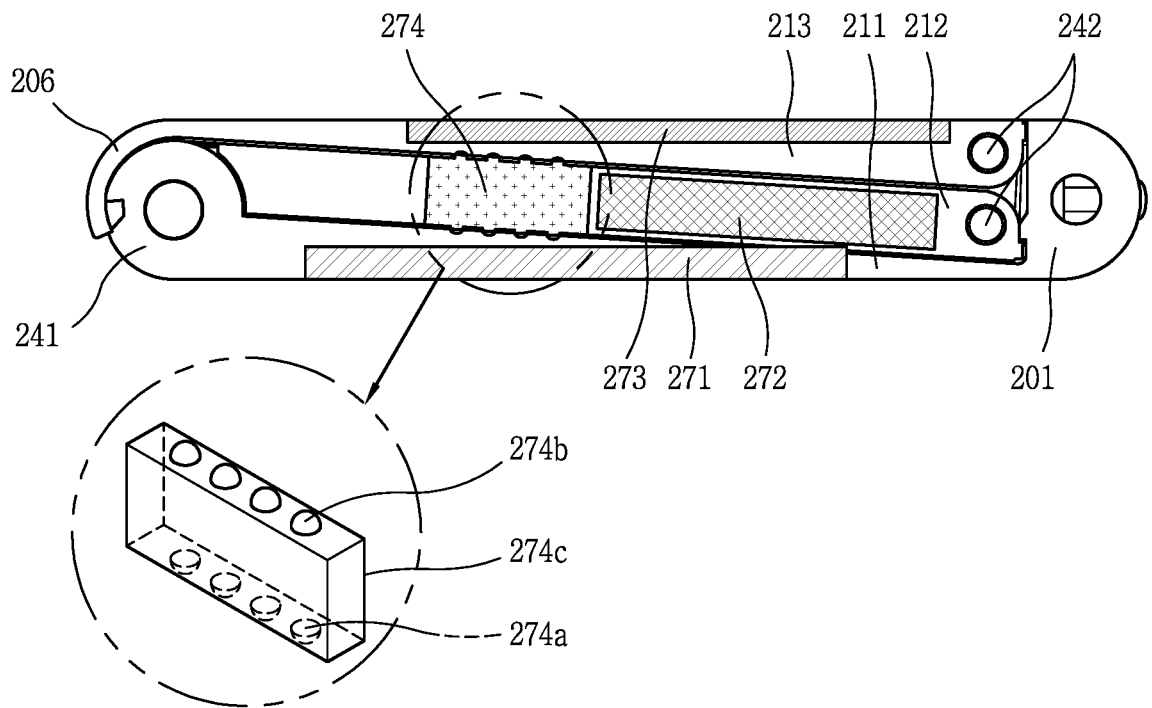
Figure 4B:
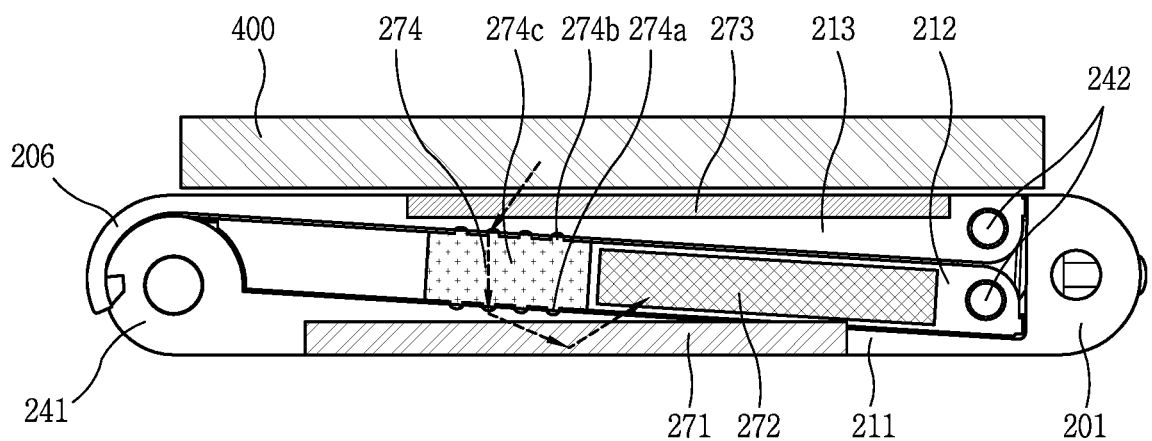

FIGS. 4A and 4B are views illustrating the mobile terminal having a connecting member for electrically connecting the first and third bodies in the second state.

Figure 4C:
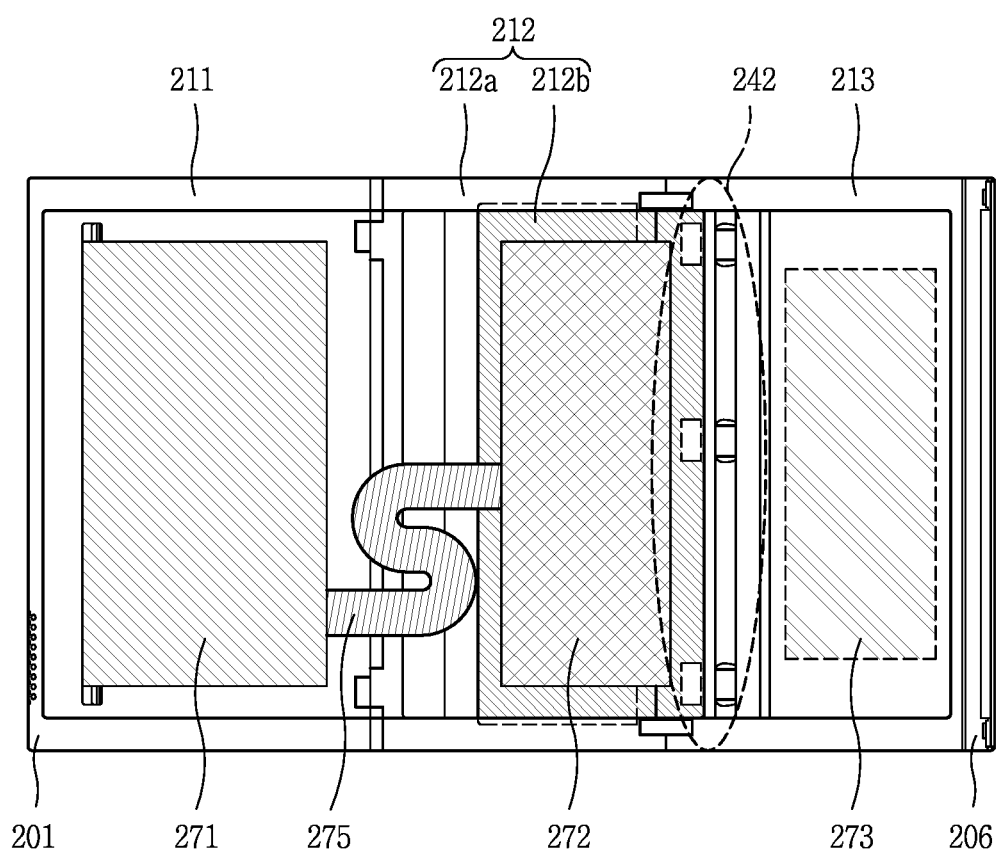

FIG. 4C is a view illustrating the mobile terminal having a flexible printed circuit board for electrically connecting the first and second bodies in the first state.

Figure 5A:
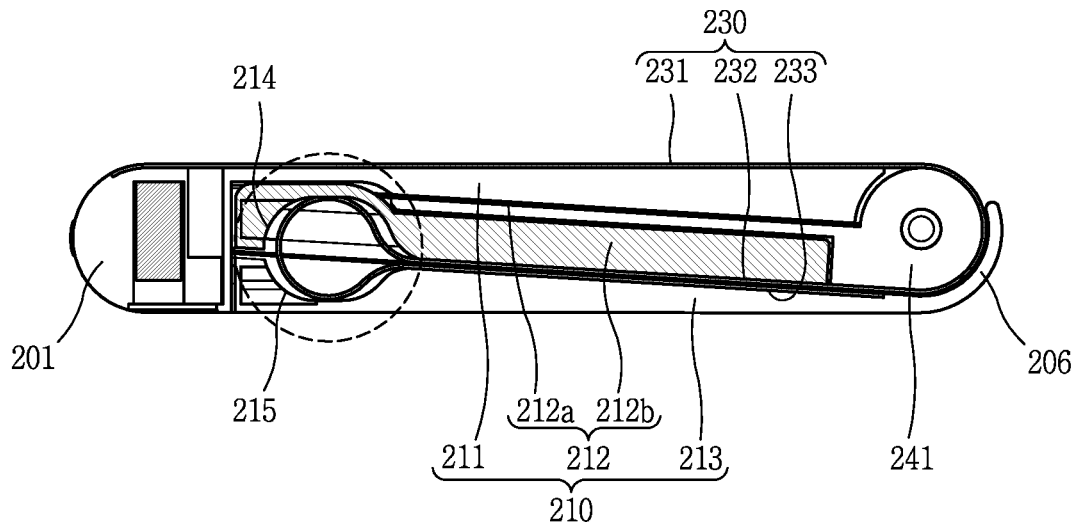
Figure 5B:
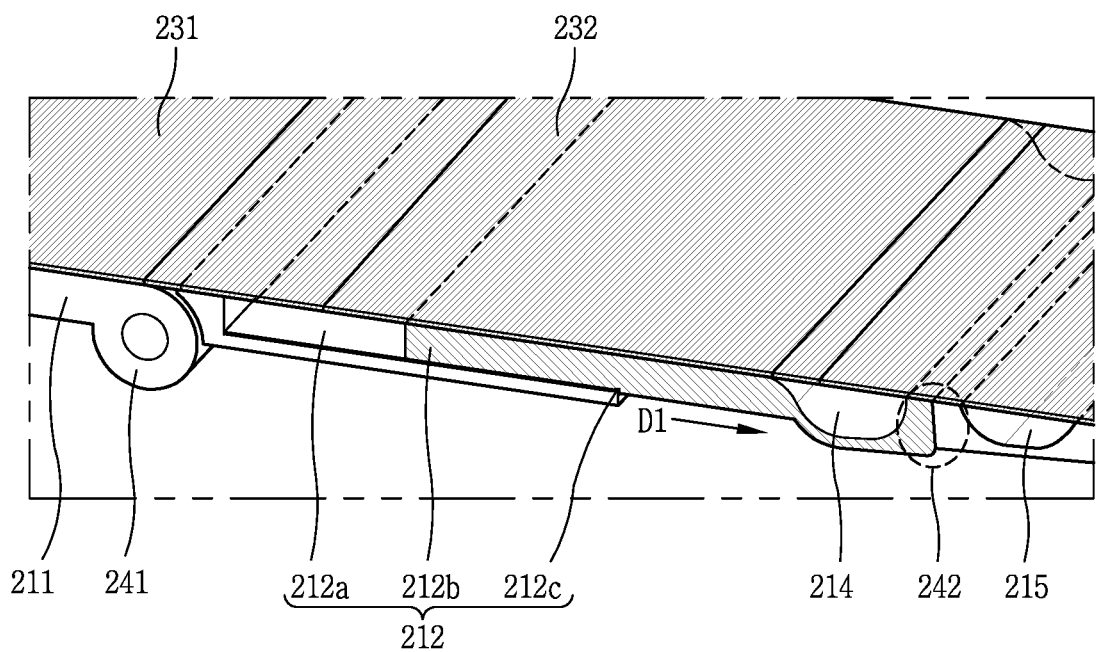

FIGS. 5A and 5B are cross-sectional views of FIG. 2A for explaining the structure of the mobile terminal in accordance with the one embodiment of the present disclosure.

FIGS. 6A to 6D are views illustrating a structure for separating the first to third bodies in the second state and a structure for overlapping the first to third bodies in the first state, in the mobile terminal in accordance with the one embodiment of the present disclosure.

BEST MODE FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
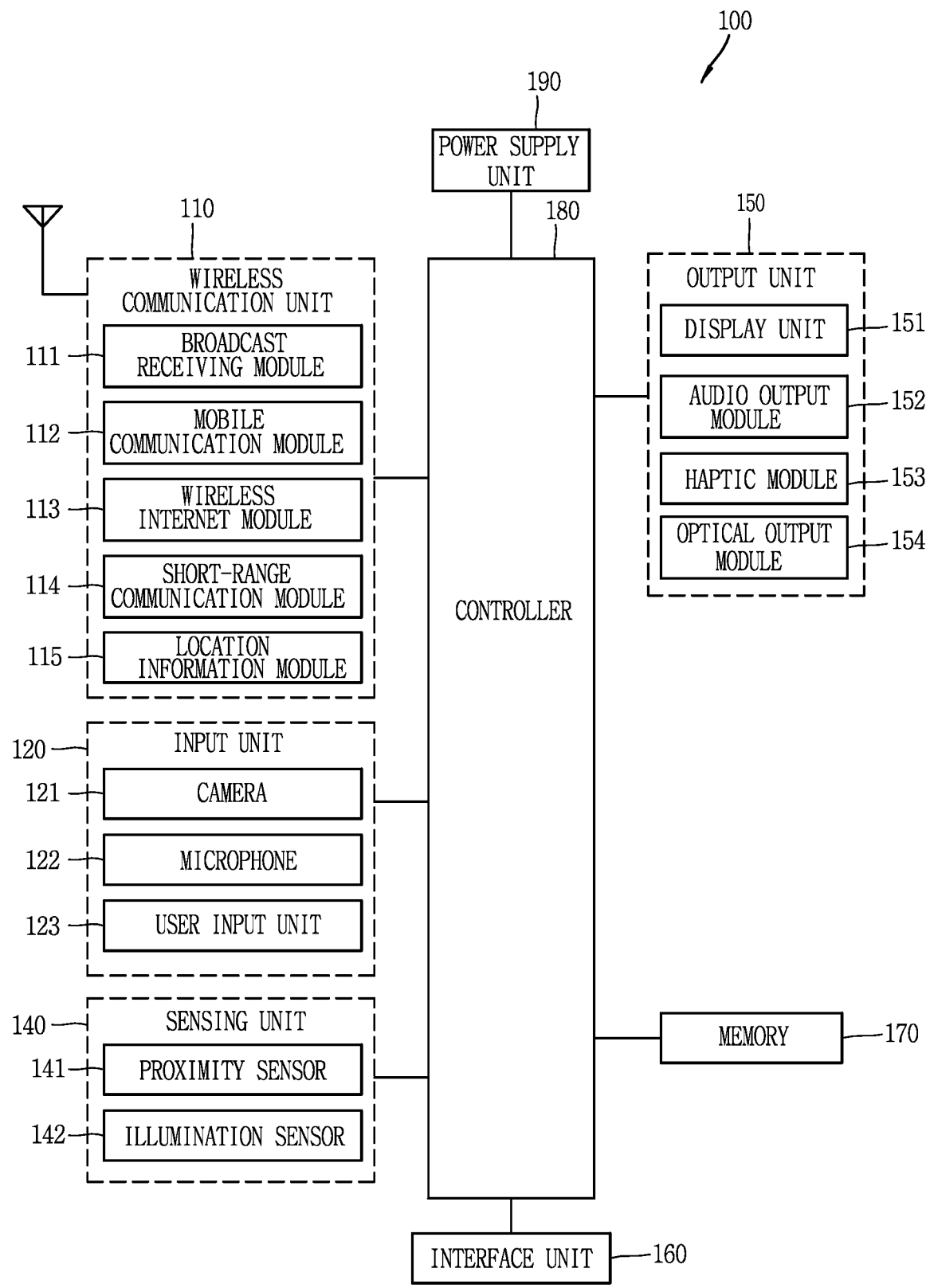
FIG. 1A is a block diagram of a mobile terminal in accordance with one embodiment of the present disclosure.
Figure 1B:
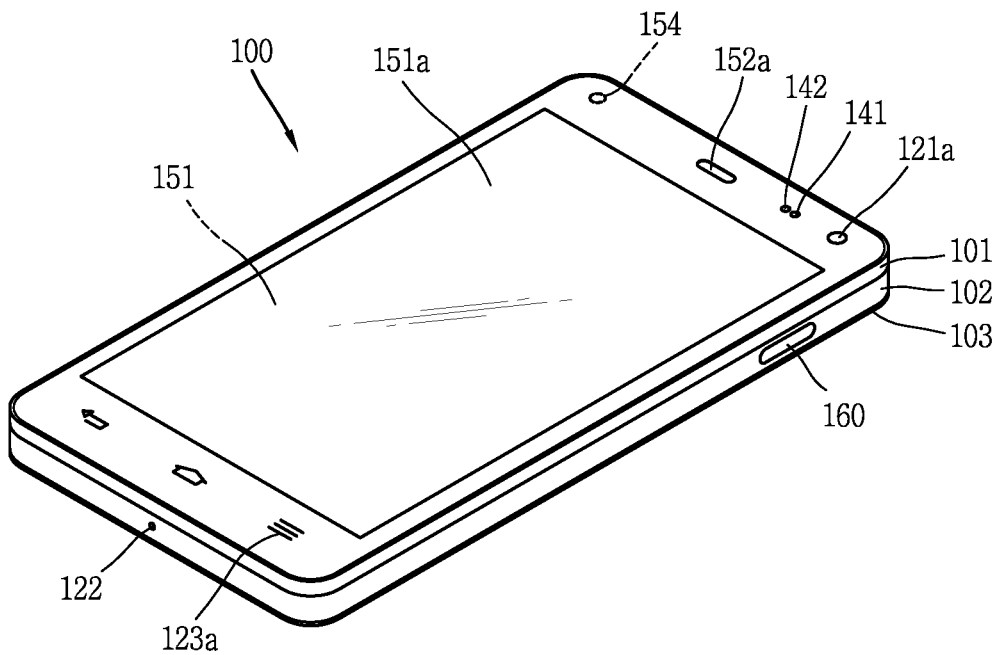
FIGS. 1B and 1C are conceptual views illustrating one example of a mobile terminal according to the present disclosure, viewed from different directions.
Figure 1C:
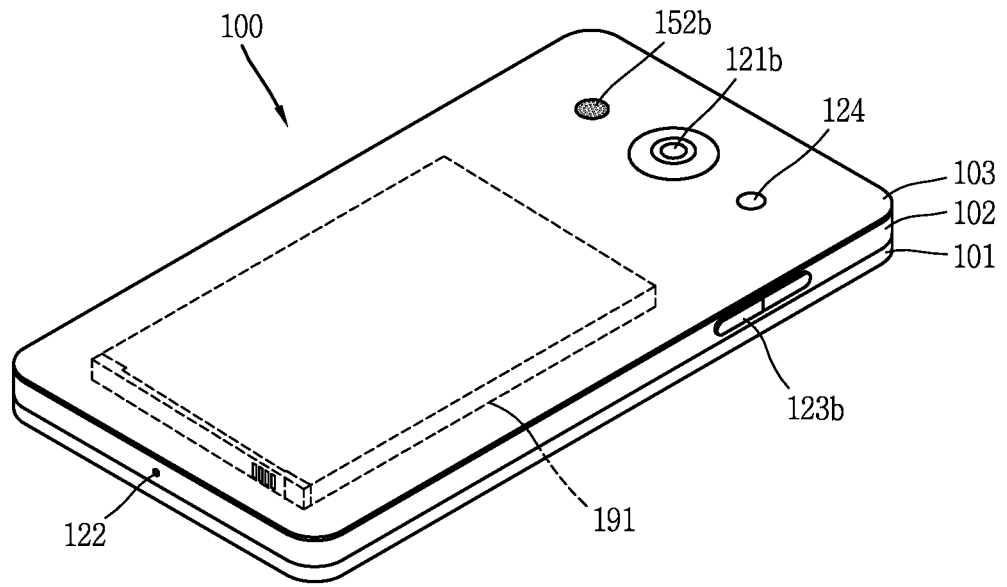

Referring to FIGS. 1A to 1C, FIG. 1A is a block diagram of a mobile terminal in accordance with one exemplary embodiment of the present disclosure, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing; a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

A mobile terminal 200 according to the present disclosure includes a flexible display unit 230 that can be deformed by an external force. The deformation may be at least one of curving, bending, folding, twisting, and rolling of a display module. The deformable display module may be referred to as 'flexible display unit 230'. Here, the flexible display unit 230 may include a typical flexible display, electronic paper (e-paper), and a combination thereof.

The typical flexible display refers to a durable display that is lightweight and does not break easily by being fabricated on a thin, flexible substrate, such as paper, which is bent, curved, folded, twisted or rolled while maintaining characteristics of an existing flat panel display.

In addition, the e-paper is a display to which general ink characteristics are applied, and may be different from the existing flat panel displays in view of using reflected light. The e-paper may change information by using a twist ball or electrophoresis using a capsule.

In a state where the flexible display unit 230 is not deformed (e.g., a state having an infinite radius of curvature, hereinafter, referred to as a first state), a display area of the flexible display unit 230 is flat. When the first state is switched to a state where the flexible display unit is deformed by an external force (e.g., a state having a finite radius of curvature, hereinafter, referred to as a second state), the display area may be curved.

Information displayed in the second state may be visual information output on a curved surface. Such visual information is realized by independently controlling an emission of unit pixels (sub-pixels) which are arranged in a matrix form. The unit pixel denotes an elementary unit for representing one color.

The flexible display unit 230 may be placed in a curved state (e.g., curved up or down or to left or right), other than a flat state, in the first state. In this case, if an external force is applied to the flexible display unit 230, the flexible display unit 230 may be deformed into a flat state (or a less curved state) or a more curved state.

Meanwhile, the flexible display unit 230 may be combined with a touch sensor to implement a flexible touch screen. When a touch is applied to the flexible touch screen, the controller 180 may perform a control corresponding to the touch input. The flexible touch screen may be configured to sense a touch input even in the second state as well as the first state.

The state of the flexible display unit 230 is not always changed by the external force. For example, when the flexible display unit 230 is in the first state, the first state may also be changed to the second state by a command of a user or an application.

FIG. 2A is a perspective view illustrating a mobile terminal 200 having a flexible display unit 230. Referring to FIG. 2A, a mobile terminal 200 according to one embodiment of the present disclosure includes a body part 210 and a flexible display unit 230 mounted on the body part 210.

The body part 210 includes first to third bodies 211, 212 and 213 rotatably connected together. The first body 211 is connected to the second body 212 and the second body 212 is connected to the third body 213 so that the first to third bodies 211, 212, and 213 form the integral body part 210.

The body part 210 may include a front surface on which the flexible display unit 230 is mounted and a rear surface opposite to the front surface. The flexible display unit 230 may be mounted to cover at least part of the front surface of the body part 210.

The body part 210 may selectively implement a first state in which the first to third bodies 211, 212 and 213 are arranged side by side in one direction and a second state in which the first to third bodies 211, 212, and 213 overlap one another.

The flexible display unit 230 is mounted on the front surface of the body part 210. An adhesive member (not shown) may be disposed between the body part 210 and the flexible display unit 230. In addition, the flexible display unit 230 can be realized from the first state to an unfolded state and from the second state to a folded state.

The first to third bodies 211, 212, and 213 include preset bezel portions formed to cover edges of the flexible display unit 230, and each of the first to third bodies 211, 212, and 213 has a preset thickness.

(a) of FIG. 2A is a view illustrating the mobile terminal 200 in the first state in which the first to third bodies 211, 212 and 213 are arranged side by side in one direction, and (b) of FIG. 2A is a view illustrating the mobile terminal 200 in the second state in which the first to third bodies 211, 212, and 213 are in an overlapped state. (c) of FIG. 2A is a view illustrating the mobile terminal 200 in an intermediate state in which the first to third bodies 211, 212, and 213 are held at predetermined angles.

Referring to (a) to (c) of FIG. 2A, the first to third bodies 211, 212, and 213 are rotatably connected together by at least one hinge unit.

The hinge unit of the mobile terminal 200 according to the one embodiment of the present disclosure may include a first hinge portion 241 connecting the first and second bodies 211 and 212 and a second hinge portion 242 connecting the second and third bodies 212 and 213.

The first body 211 may be rotated in one direction with respect to the second body 212 by the first hinge portion 241 and the third body 213 may be rotated in another direction different from the one direction with respect to the second body 212 by the second hinge portion 242. That is, the second state may be implemented as the first and third bodies 211 and 213 are rotated in different directions with respect to the second body 212 in the first state.

As illustrated in (a) of FIG. 2A, the flexible display unit 230 may implement a fully opened (or unfolded) state in the first state.

The flexible display unit 230 may include first to third areas 231, 232, and 233 supported by the first to third bodies 211, 212, and 213, respectively. That is, the first body 211 supports the first area 231 of the flexible display unit 230, the second body 212 supports the second area 232 of the flexible display unit 230, and the third body 213 supports the third area 233 of the flexible display unit 230.

Therefore, the first to third areas 231, 232, and 233 of the flexible display unit 230 may be flush with one another in the first state.

When the flexible display unit 230 is attached to a front surface of the body part 210, the first to third areas 231, 232, and 233 of the flexible display unit 230 are externally exposed in the first state so that the user can see displayed information.

As illustrated in (b) and (c) of FIG. 2A, when the body part 210 is switched from the first state to the second state, a first bending area of the flexible display unit 230 is supported by an area of the first hinge portion 241 for connecting the first and second bodies 211 and 212, and a second bending area of the flexible display unit 230 is supported by an area of the second hinge portion 242 for connecting the second and third bodies 212 and 213.

The first bending area may be configured to surround at least part of the first hinge portion 241 when the body part 210 is switched from the first state to the second state, and the second bending area may be configured to be bent in the second state by accommodating units 214 and 215, which are formed adjacent to the second hinge portion 242.

The accommodating units 214 and 215 will be described with reference to FIGS. 5A and 5B to be described later.

That is, in the second state, the first, second, and third bodies 211, 212, and 213 are rotated to be in an overlapped state. Thus, the first area 231, which is attached on one surface of the first body 211, of the flexible display unit 230 is externally exposed, and the second and third areas 232 and 233 and the second bending area are covered to be invisible from outside by the overlapped structure of the first to third bodies 211, 212, and 213.

Referring to (d) of FIG. 2A, the first body includes a first upper body 220 and a first lower body 221, and the first upper body 220 includes first and second end portions 201 and 202 formed on both sides thereof, respectively.

The second body 212 includes a first frame 212a mounted to be rotatable with respect to the first body 211, and a second frame 212b slidably mounted on the first frame 212a. The second body 212 includes third and fourth end portions 203 and 204 formed on both sides thereof, respectively. The sliding structure for the first and second frames 212a and 212b will be described later with reference to FIG. 5.

The third body 213 includes a third upper body 222 and a third lower body 223 and the third lower body 223 includes fifth and sixth end portions 205 and 206 formed on both sides thereof, respectively.

Referring to (d) of FIG. 2A, the first upper body 220 includes a first surface 220a on which the first area 231 of the flexible display 230 is attached, and a second surface 220b located on an opposite position to the first surface 220a. The first lower body 221 may be coupled to the second surface 220b of the first upper body 220. The main printed circuit board 271 may be disposed in a mounting space formed by the first upper body 220 and the first lower body 221.

In addition, a camera module 290 may be mounted to one side of the first upper body 220 and the first lower body 221.

The first end portion 201 of the first upper body 220 is formed to have a preset thickness. This is for adjacent portions of the second and third bodies 212 and 213 to be covered (veiled) by the thickness of the first end portion 201 in the second state.

The second end portion 202 of the first upper body 220 engages with the third end portion 203 of the first frame 212a. The coupling structure may be implemented by the first hinge portion 241. More specifically, the first hinge portion 241 connects the first and second bodies 211 and 212 to each other, such that the first and second bodies 211 and 212 can be rotated related to each other.

The first hinge portion 241 includes a hinge shaft formed between end portions of the first and second bodies 211 and 212, which are adjacent to each other, that is, between the second and third end portions 202 and 203. The hinge shaft is generally formed in a cylindrical shape. The first and second bodies 211 and 212 may rotate centering around the hinge shaft while facing each other.

The second end portion 202 of the first body 211 may be provided with a connecting portion which is formed to surround one area of the hinge shaft, or the second end portion 202 and the hinge shaft may be formed integrally with each other. In this case, the third end portion 203 is coupled to the second end portion 202 of the first body 211, that is, the hinge shaft of the first hinge portion 241.

The hinge shaft of the first hinge portion 241 may protrude from a rear surface of the body part 210 and thus may not be exposed to the front surface, to which the flexible display part 230 is attached, in the first state. This is to make appearance of the mobile terminal 200 neater.

Meanwhile, the fourth end portion 204 of the second body 212 is coupled to the fifth end portion 205 of the third lower body 223. The coupling structure may be implemented by the second hinge portion 242.

The second hinge portion 242 connects the second and third bodies 212 and 213 to be rotatable relative to each other, and may be formed in a similar structure to a general concealed door hinge. The concealed door hinge connects various types of doors including fire doors to a door frame in a manner that appearance is not exposed to outside in a door-closed state.

The second hinge portion 242 may include a fixing piece, a shaft pin (not shown) and a rotating piece. The fixing piece (not shown) may include a first coupling portion 242a mounted on the second body 212, and a second coupling portion 242b mounted on the third body 213.

The first and second coupling portions 242a and 242b are disposed on end portions of the second and third bodies 212 and 213, which are adjacent to each other, namely, the fourth and fifth end portions 204 and 205 in a manner of being veiled by a structure in which the fourth and fifth end portions 204 and 205 face each other in the first state.

The first and second coupling portions 242a and 242b are formed integrally with each other, and mounted on the end portions of the second and third bodies 212 and 213, namely, the fourth and fifth end portions 204 and 205, respectively. As the first and second coupling portions 242a and 242b are coupled to each other, the second and third bodies 212 and 213 can be connected to each other to be relatively rotatable center on the second hinge portion 242.

Referring to (d) of FIG. 2A, the third upper body 222 is formed to cover at least part of the third lower body 223 and mounted on one surface of the third lower body 223. The third upper body 222 is preferably formed to be smaller than the third lower body 223 in size. An antenna module (not shown) may be disposed between the third upper body 222 and the third lower body 223.

The sixth end portion 206 of the third lower body 223 may be bent to surround at least part of an outer circumferential surface of the second end portion 202 of the first upper body 220.

Therefore, in the second state in which the first to third bodies 211, 212, and 213 overlap one another, the sixth end portion 206 can surround the second end portion 202, so that the mobile terminal 200 according to the one embodiment of the present disclosure can maintain the second state more stably.

FIG. 2B is a rear view of the body part when the body part is in the first state, and FIG. 2C is a lateral view of the body part when the body part is in the second state.

As illustrated in FIGS. 2B and 2C, the first end portion 201 may have a preset thickness so that the second and third bodies 212 and 213 having the fourth and fifth end portions 204 and 205, respectively, are accommodated in the first body 211 in an overlapped state, in the second state.

In this manner, the first end portion 201 is referred to as a receiving portion for accommodating the second and third bodies 212 and 213 in the second state. Hereinafter, the first end portion 210 is referred to as a receiving portion. The size of the receiving portion may be substantially the same as the length of the adjacent fourth and fifth end portions 204 and 205, which is measured in a thickness direction of the mobile terminal 200.

The receiving portion 201 may form an inner space, and a first magnet portion 261, which is to be described later, may be disposed in the inner space formed by the receiving portion 201.

The receiving portion 201 may include a button portion 251 that is pressed by an external force. As the button portion 251 is pressed, the first magnet portion 261 is moved in a direction that the button is pressed so as to generate repulsive force against a second magnet portion 262.

As aforementioned, the sixth end portion 206 is referred to as a bent portion. The first to third bodies 211, 212, and 213 may be stably maintained in the second state as the bent portion is hooked on the first hinge portion 241 connecting the first and second bodies 211 and 212. Therefore, the sixth end portion 206 is preferably larger than a diameter of the first hinge portion 241.

Referring to FIG. 2B, the fourth and fifth end portions 204 and 205, which are adjacent to each other in the first state, in which the first to third bodies 211, 212, and 213 are arranged side by side in one direction, are disposed to face each other. Therefore, the first and second coupling portions 242a and 242b coupled to the fourth and fifth end portions 204 and 205, respectively, are not exposed to the outside.

In other words, the first coupling portion 242a is hidden by the fifth end portion 205 which is one end portion of the third body 213 and the second coupling portion 242b is hidden by the second body 212, which is one end portion of the second body 212.

On the other hand, referring to FIG. 2C, when the first to third bodies 211, 212 and 213 are switched from the first state to the second state in which they overlap each other, the fourth and fifth end portions 204 and 205 are arranged to face the same direction. Therefore, at least parts of the first and second coupling portions 242a and 242b may be exposed to the outside in the intermediate state. However, when the body part 210 is implemented in the second state, the first and second coupling portions 242a and 242b may be hidden again from the outside by the receiving portion 201.

FIGS. 3A and 3B are cross-sectional views illustrating mounting spaces of electronic components for driving the mobile terminal in accordance with the one embodiment of the present disclosure, and the electronic components mounted in the mounting spaces.

Referring to FIG. 3A, the present disclosure is equipped with a plurality of electronic components in order to realize the mobile terminal 200 which can normally operate in the first and second states, respectively. The first to third bodies 211, 212, and 213 includes first to third mounting spaces for mounting the plurality of electronic components, respectively.

The first and second bodies 211 and 212 have a preset thickness between the front surface of the body part 210 and the rear surface of the body part 210, by a radius of the first hinge portion 241. Accordingly, the first and second bodies 211 and 212 may include first and second mounting spaces formed by the preset thickness.

As described above, a main circuit board 271 for generating electric signals according to electronic components, and the like may be disposed in the first mounting space. In addition, the first mounting space may secure substantially the same area as the first area 231 of the flexible display unit 230.

A power supply unit 272 for supplying power to the mobile terminal 200 may be disposed in the second mounting space. The power supply unit may be a slidable battery module 272 which will be described later.

In addition, the third body 213 may be formed to have a thickness which is reduced toward the bent portion which is the sixth end portion 206. That is, the third body 213 has a maximum thickness t1 at the fifth end portion 205 which is an end portion adjacent to the second body 212. The third body 213 may be reduced in thickness toward the sixth end portion 206 and have a minimum thickness t2 at the sixth end portion 206. This is for completely accommodating the second and third bodies 212 and 213 in the first body 211 in the overlapped state, so that the body part 210 can realize the second state.

The third body 213 may thus have the third mounting space formed by the maximum thickness t1 and the minimum thickness t2 thereof. In the third mounting space, a charging module 273 and the like may be disposed.

The plurality of electronic components respectively arranged in the first to third mounting spaces are arranged side by side in the same direction as a direction in which the first to third bodies 211, 212 and 213 are arranged in the first state.

Referring to FIG. 3B, when the body part 210 is in the second state, the second body 212 overlaps the first lower body 221 where the first area 231 of the flexible display unit 230 is not attached, and the third body 213 overlaps one surface of the second frame 212b where the second area 232 of the flexible display unit 230 is attached.

The plurality of electronic components respectively disposed in the first to third mounting spaces is arranged in the thickness direction of the mobile terminal 200 so that at least some of the electronic components overlap in the second state. That is, in the second state, the main circuit board 271, the power supply unit 272, and the charging module 273 may be stacked in a manner that at least parts of them overlap each other.

However, the electronic components mounted in the first to third mounting spaces are not limited thereto, and the shapes and relative sizes of the first to third mounting spaces are not limited to those shown in the drawings.

FIGS. 4A and 4B are views of the mobile terminal 200 including a connection member 274 for electrically connecting the first and third bodies 211 and 213 when the body part 210 is in the second state, and FIG. 4C is a view of the mobile terminal 200 including a flexible circuit board 275 for electrically connecting the first and second bodies 211 and 212 when the body part 210 is in the first state.

In order to make the mobile terminal 200 operate normally, the plurality of electronic components disposed in the first to third mounting spaces must be electrically connected to one another.

The main circuit board 271 which is disposed in the first body 211 in the first state should be electrically connected to the electronic components disposed in the second and third bodies 212 and 213, and the main circuit board 271 which is disposed in the first body 211 in the second state should be electrically connected to the charging module 273 disposed in the third body 213.

Referring to FIG. 4A, the body part 210 may include a connection member 274 by which the main circuit board 271 and the electronic components disposed in the third body 213 can be electrically connected to each other.

The connection member 274 must electrically connect the first and third bodies 211 and 213, and thus may be fixedly inserted into the second body 212 located between the first and third bodies 211 and 213. In addition, the connection member 274 may be disposed in the second mounting space in a manner of being spaced apart from the power supply unit 272.

The connection member 274 may be formed of a Pogo pin. The Pogo pin is used as a configuration for transferring electric signals among electronic components, such as a semiconductor wafer, an LCD module, a semiconductor package, various sockets, and the like.

The connection member 274 includes an insulating main body 274c, a first protrusion 274a brought into contact with the first body 211, and a second protrusion 274b brought into contact with the second body 212. The first and second protrusions 274a and 274b are respectively formed to protrude from both surfaces of the insulating main body 274c. The first and second protrusions 274a and 274b may be inserted into the first lower body 221 and the third upper body 222, respectively.

The first and third bodies 211 and 213 may include first and second connecting portions (not shown) which are brought into contact with the first and second protrusions 274a and 274b. In order for the first and third bodies 211 and 213 to be electrically connected to each other by the contact between the first and second connecting portions and the first and second protrusions 274a and 274b, the first and second connecting portions must be preferentially electrically connected to the plurality of electronic components disposed in the first to third mounting spaces.

Referring to FIG. 4B, in a second state, the first area 231 of the flexible display unit 230 may be externally exposed, the second and third areas 232 and 233 may be hidden by the second and third bodies 212 and 213, and one surface of the third lower body 223 may be externally exposed so as to be in contact with an external charger 400.

The external charger 400 may be implemented as a general wireless charger. The external charger 400 is brought into contact with the one surface of the third lower body 223 in the second state so as to apply a current to the charging module 273.

That is, the charging module 273 is disposed in the third body 213 to receive a current from the external charger 400 which is electrically connected to the third body 213 in the second state.

The current passed through the charging module 273 is applied to the main circuit board 271 through the connection member 274 and the current applied to the main circuit board 271 is supplied to the power supply unit 272 through the flexible circuit board 275, which will be described later.

Referring to FIG. 4C, the body part 210 may include a flexible circuit board 275 by which the main circuit board 271 and the electronic components disposed in the second body 212 can be electrically connected to each other.

The flexible circuit board 275 may be formed to be bent (or curved) in the first and second states of the body part 210, and disposed between the first and second bodies 211 and 212. Therefore, the flexible circuit board 275 may be connected to the main circuit board 271 disposed in the first body 211 and the power supply unit 272 disposed in the second body 212, and may electrically connect the first and second bodies 211 and 212.

According to the present disclosure, the mobile terminal 200 can be realized to operate normally by the structure, which is implemented by the connection member 274 and the flexible circuit board 275, even in the state where the first to third bodies 211, 212, and 213 are arranged side by side in one direction so that the flexible display unit 230 is fully unfolded, and the state where the first to third bodies 211, 212, and 213 overlap one another so that only the first area 231 of the flexible display unit 230 is externally exposed.

FIGS. 5A and 5B are sectional views of FIG. 2A for explaining the structure of the mobile terminal 200 according to one embodiment of the present disclosure. The mobile terminal 200 according to the one embodiment includes the body part 210, the flexible display unit 230, and a hinge module 240.

As aforementioned, the body part 210 may include the first body 211, the second body 212 and the third body 213. The second body 212 may include the first frame 212a mounted to be rotatable with respect to the first body 211, and the second frame 212b slidably mounted to the first frame 212a.

The first frame 212a is connected to the first hinge unit 241 so as to be relatively rotatable from the first body 211 centering on the hinge shaft of the first hinge unit 241. In order for the first and second bodies 211 and 212 having preset thicknesses to fully overlap each other, the first frame 212a is preferably connected to a lower portion of the first hinge portion 241 which is lower than the position of the hinge shaft as the center of the first hinge portion 241. The first frame 212a may further include a connecting portion (not shown) which is formed to surround at least part of an outer circumferential surface of the first hinge portion 241.

One surface of the second frame 212b is mounted on the first frame 212a and another surface of the second frame 212b is formed such that a part of the second area 232 of the flexible display unit 230 is attached thereto. Although not shown in detail, an adhesive member may be formed between the second area 232 of the flexible display unit 230 and the another surface of the second frame 212b.

Referring to FIG. 5A, when the body part 210 is in the second state, the fourth and fifth end portions as the end portions of the respective second and third bodies 212 and 213, which sequentially overlap each other, are completely accommodated in an accommodation area formed by the first end portion 201. In this case, a length (or gap) between the third and fourth end portions 203 and 204 substantially disappears, and the third and fourth end portions 203 and 204 may form substantially the same end portion.

The body part 210 according to one embodiment of the present disclosure may further include an accommodating unit for accommodating the first and second bending areas. The accommodating unit includes first and second accommodating portions 214 and 215 which are recessed in the second and third bodies 212 and 213, respectively.

More specifically, the first accommodating portion 214 is recessed by a predetermined depth into one surface of the second frame 212b so as to accommodate a portion of the second bending area.

The second accommodating portion 215 is recessed by a predetermined depth into one surface of the third body 213 so as to accommodate the rest of the second bending area.

The second accommodating portions 215 is arranged side by side with the first accommodating portion 214 in a sliding direction of the second frame 212a in the first state, and overlaps the first accommodating portion 214 in the second state.

Accordingly, the flexible display unit 230 is configured so that the second bending area can be accommodated in the first and second accommodating portions 214 and 215 even in the second state as well as in the first state, so as to be bendable without damage on quality of the display.

Referring to FIG. 5B, the first accommodating portion 214 is formed in the fourth end portion 204 disposed adjacent to the third body 213. In the first state, the fifth end portion 205 of the third body 213 is disposed to face the fourth end portion 204 of the second frame 212b, and the sixth end portion 206 of the third body 213 is the aforementioned bent portion.

The first and second accommodating portions 214 and 215 are disposed to be arranged side by side in one direction in the first state, and recessed surfaces of the respective accommodating portions are disposed to face each other in the second state. Therefore, in the second state, the recessed surfaces formed in the first and second accommodating portions 214 and 215 are disposed to face each other, so as to form a predetermined space. The second bending area may be accommodated in the predetermined space accordingly.

Referring to FIG. 5B, the second frame 212b is slid with respect to the first frame 212a in a direction D1 away from the first body 211 when the second state (folded state) is switched into the first state (unfolded state). On the other hand, the second frame 212b is slid in a direction toward the first body 211, namely, in an opposite direction to the direction D1 when the first state is switched to the second state. This structure can prevent the flexible display unit 230 from getting loose in the first state.

The second body 212 may further be provided with a movement guide portion 212c for guiding sliding movement between the first and second frames 212a and 212b. The movement guide portion 212c guides the second frame 212b so that the flexible display unit 230 comes and goes in an extending direction of the flexible display unit 230, namely, the first direction D1 in the drawing, with respect to the first frame 212a in the state where the flexible display unit 230 is attached.

The movement guide portion 212c guides the second frame 212a to move in a direction away from the first frame 212a and protrudes from both ends of the first frame 212a to cover parts of both ends of the second frame 212b.

Referring to FIG. 5B, a length between the third end portion 203 of the first frame 212a and the fourth end portion 204 of the second frame 212b in the first state is defined as a first length. Also, in a state where the second body 212 is relatively rotated with respect to the first body 211 so that a specific angle is formed between the first body 211 and the first frame 212a, a length between the third and fourth end portions 203 and 204 is a second length, and the second length is shorter than the first length.

This structure realized in the present disclosure can minimize damages on folded areas of the flexible display unit 230, which are caused due to repetitive deformation (switching) of the flexible display unit 230 to the unfolded and folded states. The structure can also enhance image output quality on the folded areas.

Figure 6A:
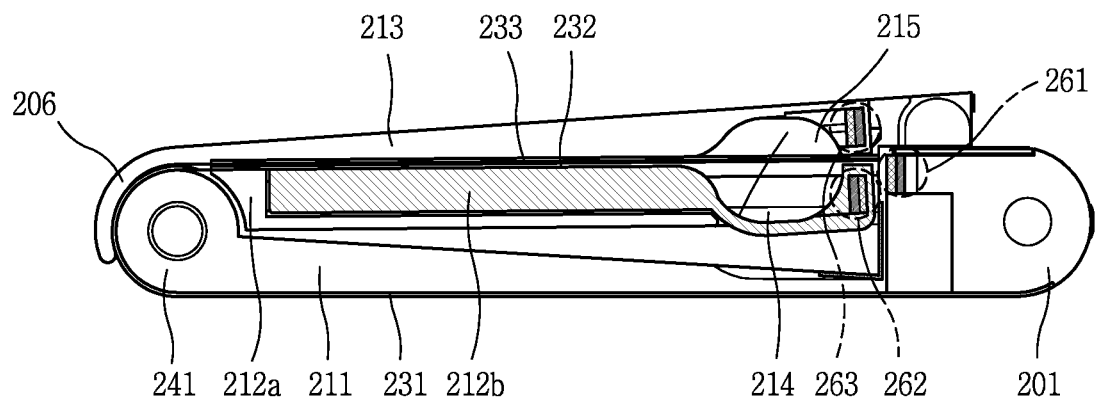
Figure 6B:
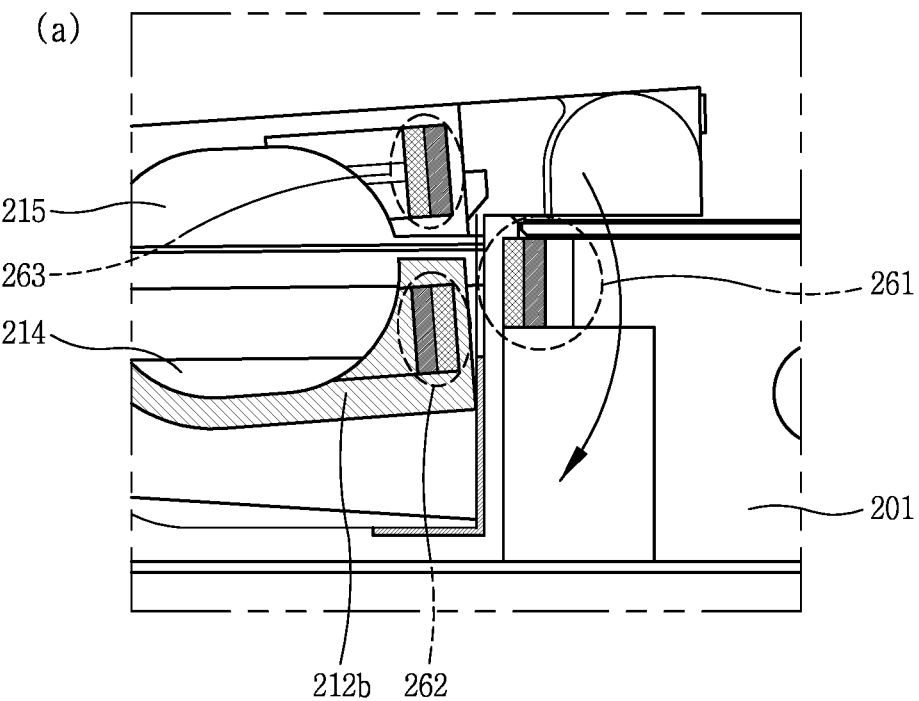
Figure 6B:
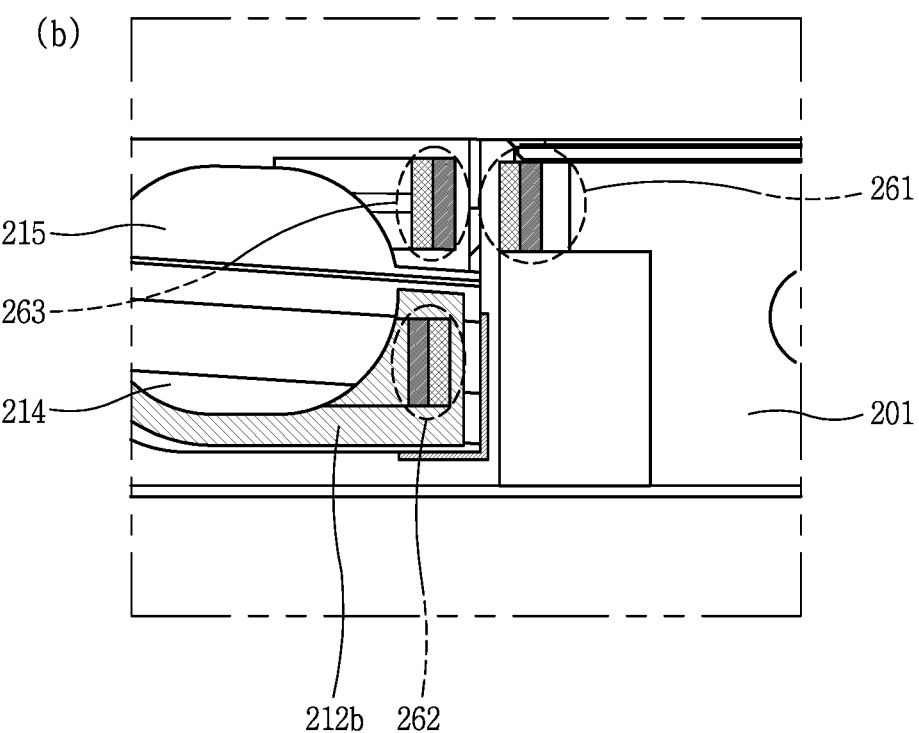
Figure 6C:
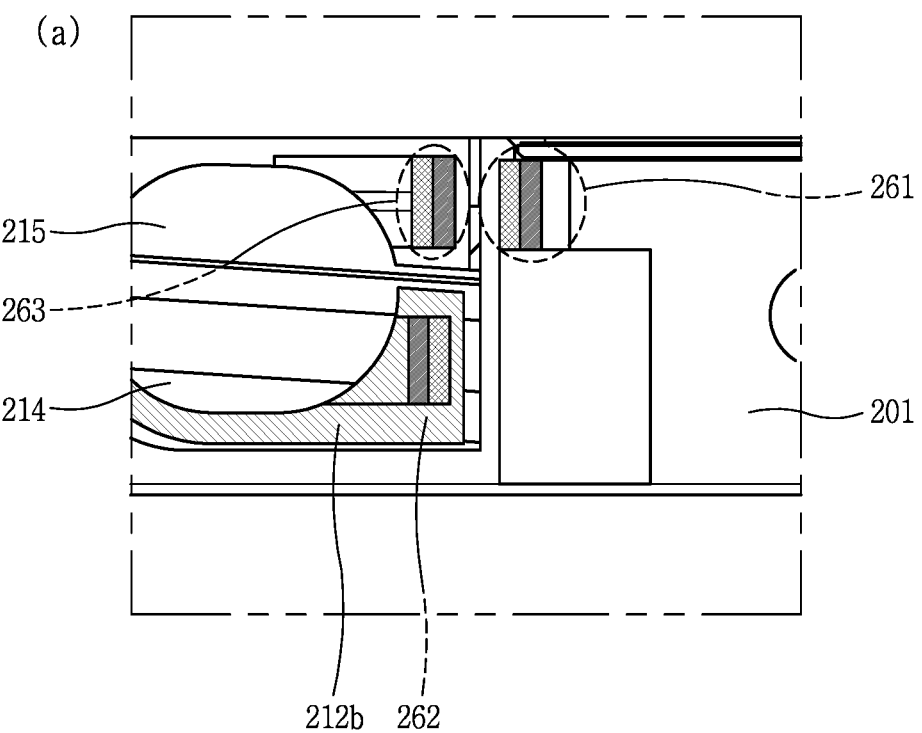
Figure 6C:
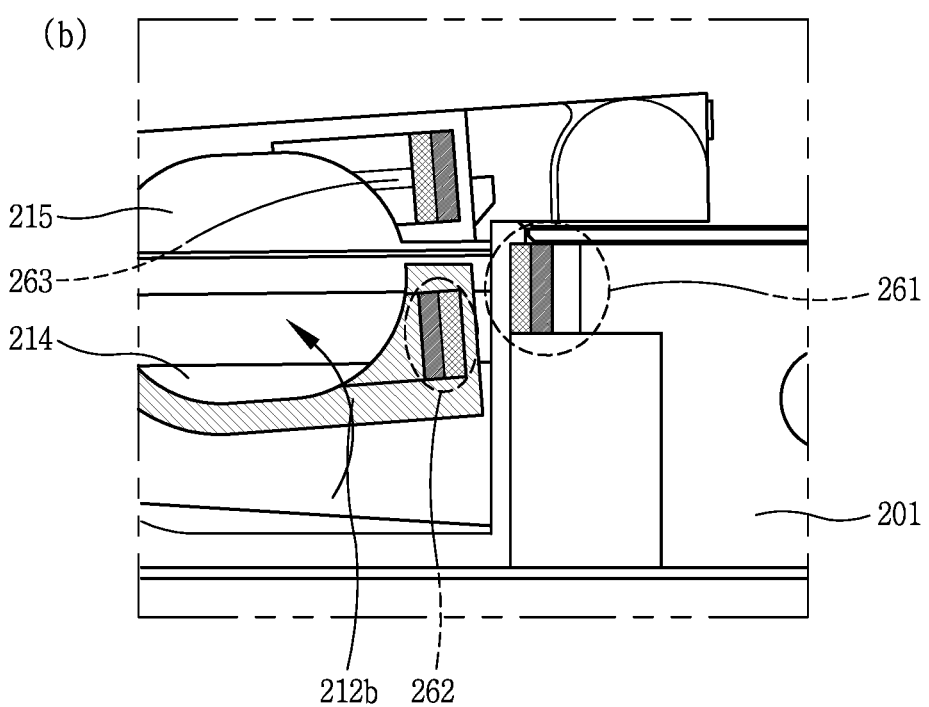

FIGS. 6A and 6B illustrate a structure for explaining a magnet unit which is configured to separate the first to third bodies 211, 212 and 213 in the second state of the mobile terminal 200 according to one embodiment of the present disclosure and to overlap the first to third bodies 211, 212, and 213 in the first state.

The mobile terminal 200 according to the one embodiment of the present disclosure may further include a magnet unit for changing the state of the body part 210.

The magnet unit allows the first to third bodies 211, 212, and 213 to be coupled in a fixed state when their shapes are changed as the bodies are aligned in a row or overlap one another.

The magnet unit may include a first magnet portion 261 disposed in an inner space formed by the receiving portion 201, a second magnet portion 262 disposed in the second body 212 to generate repulsive force against the first magnet portion 261 when the body part 210 is switched from the first state to the second state, and a third magnet portion 263 disposed in the third body 213 to generate attractive force with the first magnet portion 261 when the body part 210 is switched from the first state to the second state.

The first to third magnet portions 261, 262, and 263 are disposed in a section needed to be fixed and coupled in the body part 210 so that the first to third bodies 211, 212, and 213 are coupled in a fixed state when they are aligned in a row or overlap one another.

In other words, such configuration is to enhance operability in folding and unfolding operations by virtue of magnet arrangement that attractive force and repulsive force are combined.

The mobile terminal 200 according to the one embodiment of the present disclosure is provided with the magnet unit on portions needed to be fixed and coupled so as to maintain the first and second states. The first magnet portion 261 may be disposed on the button portion 251 and the second and third magnet portions 262 and 263 may be disposed respectively on the fourth and fifth end portions 204 and 205 of the second and third bodies 212 and 213, respectively.

More specifically, the first to third magnet portions 261, 262, and 263 have magnet arrangement with combined attractive and repulsive forces to more facilitate state switching of the body part 210 between the first and second states. The first to third magnet portions 261, 262, and 263 include N pole and S pole, respectively. The N pole and the S pole may be arranged in a lengthwise direction of the mobile terminal 200.

In one embodiment of the present disclosure, the first magnet portion 261 is disposed in a manner that its N pole is adjacent to the second and third magnet portions 262 and 263, and its S pole is farther away from the second and third magnet portions 262 and 263 than the N pole.

In addition, the second magnet portion 262 is disposed in a manner that its N pole is adjacent to the first magnet portion 261 and its S pole is farther away from the first magnet portion 261 than the N pole, so as to generate repulsive force with the N pole of the first magnet portion 261 when the first state is switched to the second state or the second state is switched to the first state. Accordingly, upon switching from the first state to the second state, the N poles of the first and second magnet portions 261 and 262 may generate the repulsive force against each other and the second body 212 may be more easily accommodated in the receiving portion of the first body 211.

In addition, when the button portion 251 is pressed by external force in the second state of the body part 210, the first magnet portion 261 mounted in the button portion 251 is also moved. The first magnet portion 261 is moved in a direction toward the second magnet portion 262. That is, the first and second magnet portions 261 and 262 generate the repulsive force between them.

More specifically, the N poles of the first and second magnet portions 261 and 262 generate the repulsive force between them and the second body 212 is pushed (pressed) in a direction away from the receiving portion 201 of the first body 211. This may facilitate the body part 210 to be realized (switched) from the second state to the first state.

The third body 213 is disposed in a manner that its S pole is adjacent to the first magnet portion 261 and its N pole is farther away from the first magnet portion 261 than the S pole, so as to generate attractive force with the N pole of the first magnet portion 261 when the first state is switched to the second state or the second state is switched to the first state.

Accordingly, when the body part 210 is switched from the first state to the second state, the N pole of the first magnet portion 261 and the S pole of the third magnet portion 263 may generate the attractive force and thus the third body 213 may be more easily accommodated in the accommodating portion of the first body 211.

Also, the N pole of the first magnet portion 261 and the S pole of the third magnet portion 263 generate the attractive force, and thus the mobile terminal 200 can maintain the second state.

Figure 6D:
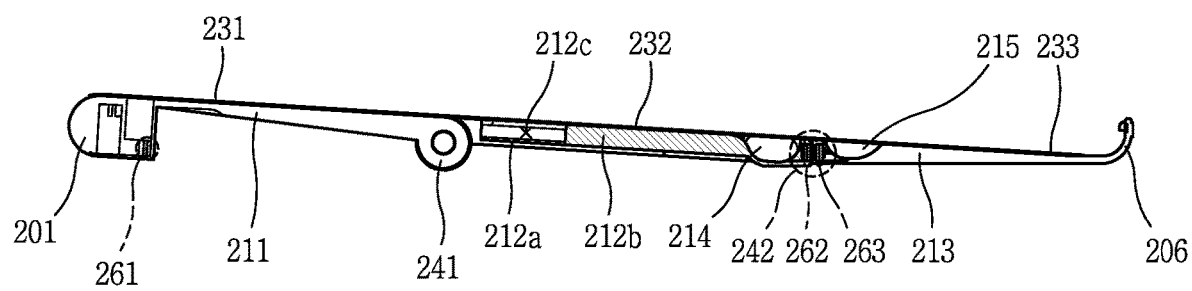

In addition, referring to FIG. 6D, in the first state, the fourth and fifth end portions 204 and 205 are disposed to face each other, and thus the N pole of the second body 212 and the S pole of the third body 213 are disposed to face each other. That is, the N pole of the second body 212 and the S pole of the third body 213 generate the attractive force, and thus the mobile terminal 200 can maintain the first state.

The present disclosure can be coupled in a fixed state in each of the first and second states, and can provide firmness and unity of the product. In addition, a folding or unfolding operation is simplified, an occupied space is reduced as compared with a complicated structure such as a hook using a gear or spring, or the like, and the risk of breakdown is also lowered.

With the aforementioned structures according to the present disclosure, the first and third bodies 211 and 213 can rotate in different directions with respect to the second body 212, respectively, which may result in stably realizing the structure of the mobile terminal 100 that is folded into three stages.

In addition, according to the present disclosure, the magnet unit may be disposed in one end portion of each of the first to third bodies 211, 212, and 213. This can facilitate the flexible display unit 230 to be switched to a folded state and an unfolded state even by applying weak external force, by virtue of the attractive force and the repulsive force of the magnets.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

The embodiments of the present disclosure propose a mobile terminal including a flexible circuit board and a Pogo pin that electrically connect a plurality of bodies when the plurality of bodies is rotatably coupled to form a three-stage structure, and thus can be applied to various related industrial fields.

The invention claimed is:

1. A mobile terminal comprising:
a body part including first to third bodies rotatably connected to one another, and that implements a first state in which the first to third bodies are arranged side by side in one direction and a second state in which the first to third bodies overlap as the first and third bodies are rotated respectively in different directions, with respect to the second body, by at least one hinge unit; and
a flexible display unit mounted on the body part,
wherein the body part comprises:
a main circuit board disposed in the first body;
a flexible circuit board electrically connecting the first and second bodies so that the main circuit board and electronic components disposed in the second body are electrically connected in the first state; and
a connection member fixedly inserted into the second body such that the main circuit board and the electronic components disposed in the third body are electrically connected in the second state,
wherein the flexible display unit is mounted on a front surface of the first to third bodies, and realized into an unfolded state in the first state and a folded state in the second state, and
wherein the second body comprises:
a first frame rotatably mounted on the first body; and
a second frame slidably mounted on the first frame,
wherein the second frame is slid in a direction away from the first body when the flexible display unit is switched from the second state to the first state,
wherein the second and third bodies includes an accommodating unit to accommodate a part of the flexible display, and
wherein the accommodating unit comprises:
a first accommodating portion recessed by a predetermined depth in one surface of the second frame to accommodate a part of the flexible display; and
a second accommodating portion arranged side by side with the first accommodating portion in a direction that the second frame is slid in the first state, and arranged to overlap the first accommodating portion to accommodate a part of the flexible display in the second state, the second accommodating portion recessed by a predetermined depth in one surface of the third body.

2. The mobile terminal of claim 1, wherein the connection member comprises a main body, and first and second protrusions protruding from both surfaces of the main body to be in contact with the first and third bodies, respectively, and
wherein the first and third bodies comprise first and second connection members disposed in the first and third bodies, respectively, to be electrically connected to the respective first and second protrusions in the second state.

3. The mobile terminal of claim 1, wherein the first frame further comprises movement guide portions protruding from both ends of the first frame to partially cover both ends of the second frame, so as to guide the second frame to come and go with respect to the first frame.

4. The mobile terminal of claim 1, wherein the hinge unit comprises a first hinge portion having a hinge shaft disposed between the first and second bodies, and connecting the first and second bodies to each other so that the first body is rotatable in one direction with respect to the second body.

5. The mobile terminal of claim 4, wherein the body part includes a front surface on which the flexible display unit is attached, and a rear surface that is disposed at a position opposite to the front surface, and
wherein the hinge shaft is disposed between the first and second bodies and protrudes from the rear surface of the body part, so that the flexible display unit is maintained evenly in the first state.

6. The mobile terminal of claim 5, wherein the flexible display unit has a first bending area supported by the first hinge portion and formed to surround a part of an outer circumferential surface of the hinge shaft when the body part is switched from the first state to the second state.

7. The mobile terminal of claim 6, wherein the second and third bodies comprises first and second portions, adjacent to each other, of end portions of the second and third bodies, and
wherein the hinge unit comprises a second hinge portion provided with first and second coupling portions mounted on the first and second portions, respectively, to be hidden from outside as the first and second portions face each other in the first state of the body part, the first and second coupling portions connecting the second and third bodies so that the third body is relatively rotatable in another direction with respect to the second body.

8. The mobile terminal of claim 7, wherein the flexible display unit has a second bending area partially supported by the second hinge portion and configured to be bent in the second state by the accommodating unit formed adjacent to the second hinge portion.

9. The mobile terminal of claim 1, wherein the third body comprises a bent portion formed at an end portion adjacent to the hinge shaft mounted in the first body in the second state, and bent to surround at least part of an outer circumferential surface of the hinge shaft when the first state is switched to the second state.

10. The mobile terminal of claim 9, wherein the first body comprises a receiving portion formed to be adjacent to the first and second portions when the body part is in the second state, to receive the second and third bodies therein in an overlapped state.

11. The mobile terminal of claim 10, further comprising:
a first magnet portion disposed in an inner space formed by the receiving portion;
a second magnet portion mounted on the first magnet portion to generate repulsive force against the first magnet portion when the body part is switched from the first state to the second state; and a third magnet portion mounted on the second magnet portion to generate an attractive force with the first magnet portion when the body part is switched from the first state to the second state.

12. The mobile terminal of claim 11, wherein the second magnet portion is disposed to generate the attractive force with the third magnet portion so that the second and third bodies are kept received in the receiving portion in an overlapped state.

13. The mobile terminal of claim 12, further comprising a button portion mounted on the first body to be pressed by external force and moving the first magnet portion in a pressed direction of the first magnet portion so that the first magnet portion is disposed adjacent to the second magnet portion.

14. The terminal of claim 13, further comprising an elastic portion having at least one spring mounted on one side of the button portion to apply a restoring force to the button portion, and deformed in a contracting or expanding manner.

15. The mobile terminal of claim 1, wherein the second body comprises a power supply unit configured to supply power to the mobile terminal, and having a mobile battery mounted on the second frame to be slidable with respect to the first frame, and wherein the mobile battery is electrically connected to the main circuit board through the flexible circuit board.

16. The mobile terminal of claim 15, further comprising a charging module disposed in the third body to receive a current from an external charger electrically connected to the third body, wherein a current passed through the charging module is applied to the main circuit board through the connection member and the current applied to the main circuit board is applied to the power supply unit through the flexible circuit board, when the body part is in the second state.

17. The mobile terminal of claim 1, wherein the first body comprises:

a first upper body supporting one area of the flexible display unit; and a first lower body mounted on the first upper body and having a camera module mounted on one side thereof, and wherein the main circuit board is disposed between the first upper body and the first lower body.

18. The mobile terminal of claim 1, wherein the third body comprises:

a third lower body coupled to the second body to be rotatable relative to the second body;

a third upper body formed to cover at least part of one surface of the third lower body; and an antenna module disposed between the third upper body and the third lower body.

* * * * *